United States Patent [19]
Douglass

[11] Patent Number: 6,044,310
[45] Date of Patent: Mar. 28, 2000

[54] SYSTEM FOR AUTOMATIC ALIGNMENT OF A WORKPIECE

[76] Inventor: Thomas E. Douglass, 103 Windgate Rd., Oak Ridge, Tenn. 37830

[21] Appl. No.: 08/955,113

[22] Filed: Oct. 21, 1997

[51] Int. Cl.[7] .................................................. G06F 19/00
[52] U.S. Cl. ............................................................ 700/192
[58] Field of Search .................................. 700/192, 193, 700/175, 186; 318/567, 568.11; 414/736

[56] References Cited

U.S. PATENT DOCUMENTS

| | | | |
|---|---|---|---|
| 3,754,487 | 8/1973 | Nachtigal | 82/1.11 |
| 3,783,253 | 1/1974 | Anderson et al. | 318/568.1 |
| 4,688,973 | 8/1987 | Andert et al. | 409/80 |
| 4,742,609 | 5/1988 | Neumann | 483/3 |
| 4,776,749 | 10/1988 | Wanzenberg et al. | 414/680 |
| 4,802,816 | 2/1989 | Mezhinsky | 414/736 |
| 4,820,113 | 4/1989 | Farquhar | 414/736 |
| 4,929,009 | 5/1990 | Vandersluis et al. | 294/2 |
| 5,074,741 | 12/1991 | Johansson | 414/736 |
| 5,243,264 | 9/1993 | Takada et al. | 318/568.11 |
| 5,312,220 | 5/1994 | Torii et al. | 414/736 |
| 5,321,353 | 6/1994 | Furness | 318/568.11 |
| 5,451,850 | 9/1995 | Karakama | 318/568.11 |
| 5,457,367 | 10/1995 | Thorne | 318/568.11 |

*Primary Examiner*—Paul P. Gordon
*Attorney, Agent, or Firm*—Pitts & Brittian, P.C.

[57] ABSTRACT

A device ("RPLD") for providing automated alignment of a workpiece centerline with a machine tool centerline. RPLD 10 is designed for rigid attachment to various standard spindle designs, such as spindle 12. RPLD 10 includes a fixture 50, adapted to engage RPLD 10, for fixedly receiving workpiece 120. RPLD 10 incorporates a tilting plate 15 which allows for tilting of the fixture around three separate axis. Further, RPLD 10 incorporates cross-slide 30 for providing translational movement in a plane perpendicular to the machine tools centerline. A processing unit 60 receives data from a plurality of conventional transducers and, based on this data, activates the servo driven tilting plate and cross-slide so as to position the centerline of a workpiece to be both parallel and coincident with the centerline of a machine tool.

20 Claims, 3 Drawing Sheets

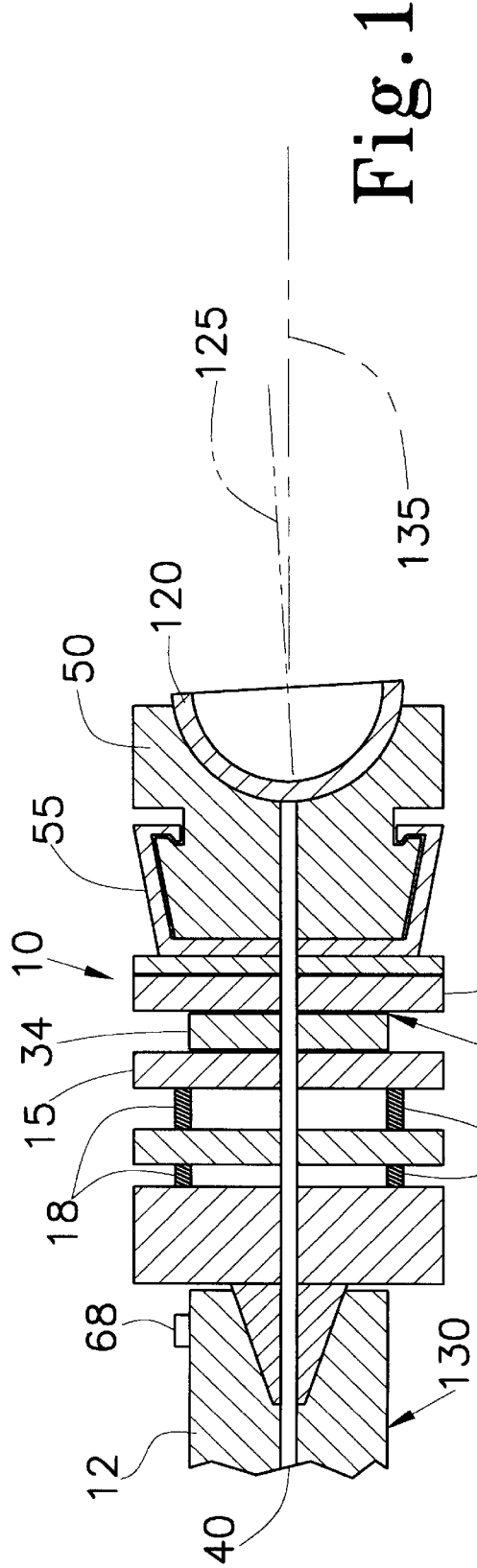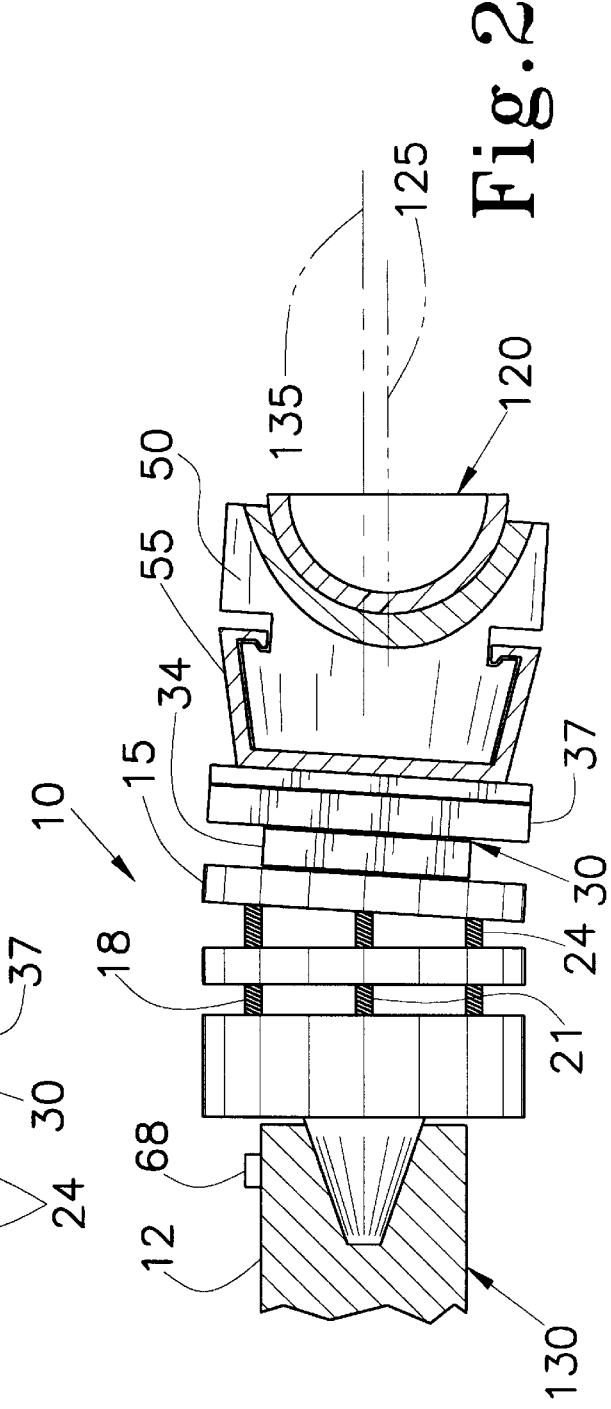

SYSTEM FOR AUTOMATIC ALIGNMENT OF A WORKPIECE

TECHNICAL FIELD

This invention relates to the field of automated machining of workpieces. More particularly, it relates to a system for automatically aligning the centerline of a workpiece with the centerline of a machine tool.

BACKGROUND ART

Robot loading and machining of object-of-revolution workpieces, under numeric control, has long been feasible. However, alignment of the workpiece centerline with the centerline of the machine tool has heretofore been a manual operation requiring accuracy and a time expenditure.

The art has numerous alignment devices and robotic end effectors. For example U.S. Pat. No. 5,312,220, issued to Torrii, et al., on May 17, 1994, discloses an industrial robot for attaching and removing a work piece from a machine tool. U.S. Pat. No. 5,321,353, issued to Furness, on Jun. 14, 1994, discloses an optical system and method for precisely positioning a robotic tool. U.S. Pat. No. 5,451,850, issued to Karakama, on Sep. 19, 1995, discloses a method of correcting a position of a tool center point. U.S. Pat. No. 5,457,367, issued to Thorne, on Oct. 10, 1995, discloses a tool center point calibration apparatus and method for accurately determining appropriate tool center points for a robot to allow for proper tool alignment and correction of robot programs. U.S. Pat. No. 4,776,749, issued to Wanzenburg, et al., on Oct. 11, 1988, discloses a robotic device which a has a support structure and tool implement holding member which is positional within three dimensional space of the support structure. U.S. Pat. No. 4,802,816, issued to Mezhinsky, on Feb. 7, 1989, discloses a pick and place machine that has two pairs of centering jaws slidably mounted in rectilinear slots of a shift plate. U.S. Pat. No. 4,820,113, issued to Farquhar, on Apr. 11, 1989, discloses a part manipulating head for attachment to a robot. U.S. Pat. No. 4,929,009, issued to Vandersluis et al., on May 29, 1990, discloses an end effector for forming part of the relocatable space station remote manipulator system. U.S. Pat. No. 5,074,741, issued to Johansson, on Dec. 24, 1991, discloses a manipulator intended for cooperation with an industrial robot. for positioning a workpiece with respect to the robot. Finally, U.S. Pat. No. 5,243,264, issued to Takada et al., on Sep. 7, 1993, discloses a tool fastening apparatus for industrial robots.

What has been missing from the art is a device that will facilitate the automated, or robot, loading of a workpiece onto a machine tool without requiring great accuracy of the robot or manual alignment.

Accordingly, it is an object of the present invention to provide a device for mechanizing the alignment of the centerline of an object-of-revolution workpiece with the centerline of a machine tool upon which the workpiece is mounted.

Another object of the present invention is to provide such a device that is adapted for rigid attachment to various standard spindle designs.

Other objects and advantages over the prior art will become apparent to those skilled in the art upon reading the detailed description together with the drawings as described as follows.

DISCLOSURE OF THE INVENTION

In accordance with the various features of this invention, a device for providing automated alignment of a workpiece centerline with a machine tool centerline is provided. The device, referred to herein as a receive/position/lock device, ("RPLD"), is designed for rigid attachment to various standard spindle designs. The RPLD incorporates a tilting plate which allows for tilting around three separate axis. Further, the RPLD incorporates cross-slide comprising a pair of orthogonal slides for providing transverse or translational movement in a plane perpendicular to the machine tool's centerline. Further, the RPLD can be adapted so as to provide service, such as a vacuum line, through the RPLD to the workpiece.

The RPLD would be installed on the spindle of the machine tool. When delivered to the tool, the workpiece would be locked in a fixture adapted to engage the RPLD. The jaws of the RPLD would be actuated by the fixture and would lock the fixture into a rigid connection with the RPLD.

The centerline of a workpiece can be generally defined in one of two manners. In this regard, the centerline can either be defined by a line passing through the center of a specified diameter and perpendicular to a specified plane or can be defined by a line passing through the center of two different diameters. The RPLD is microprocessor controlled. In this regard, the microprocessor receives signals from one or more transducers positioned on the work piece to monitor the relative position of the workpiece's centerline. An additional transducer would be utilized to indicate the rotational position of the machine tool's spindle. The microprocessor would receive transducer signals through 360 degrees of machine tool rotation and then, based on this data and a comparison of the machine tool's centerline, would direct the tilting motion of the tilting plate in order to position the workpiece's centerline such that it is parallel with the machine tool's centerline. A second rotation through 360 degrees would produce data regarding the concentricity of the work piece in relation to the machine tool's centerline. The microprocessor would then direct the translational movement of the cross-slide. The combined tilting and translational movement of the workpiece in relation to the machine tool's spindle would result in the centerline of the work piece being both parallel and coincident with the centerline of the machine tool. Iterative cycles, utilizing transducers of increasing resolution could be utilized depending upon the required degree of accuracy. Once the centerline of the work piece is both parallel and coincident with that of the machine tool, the RPLD would rigidly maintain the workpiece in the achieved orientation until the workpiece is released from the RPLD fixture.

BRIEF DESCRIPTION OF THE DRAWINGS

FIG. 1 illustrates a cross-sectional schematic view of the device of the present invention.

FIG. 2 illustrates a partial cross-sectional schematic view of the device of the present invention showing the workpiece in a tilted orientation.

BEST MODE FOR CARRYING OUT THE INVENTION

Figure 3:
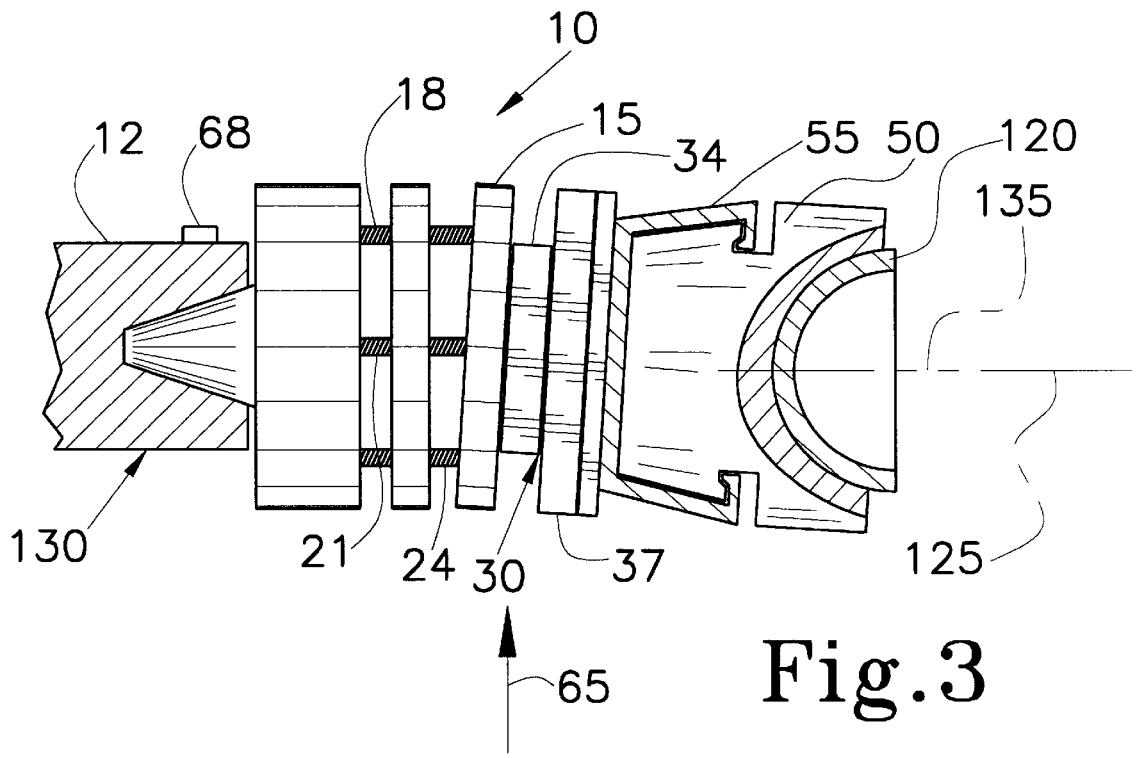
FIG. 3 illustrates a partial cross-sectional schematic view of the device of the present invention showing the workpiece after activation of the tilting plates and the cross-slide.
Figure 4:
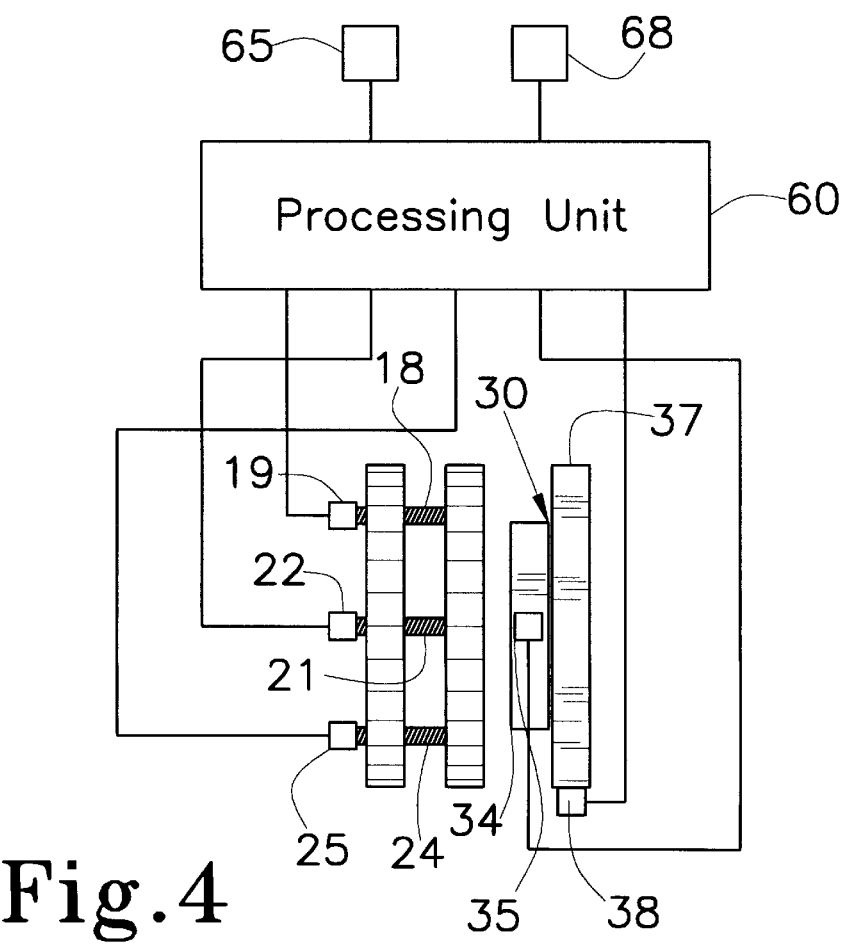
FIG. 4 illustrates a schematic view of the digital control of the alignment device of the present invention.
Figure 5:
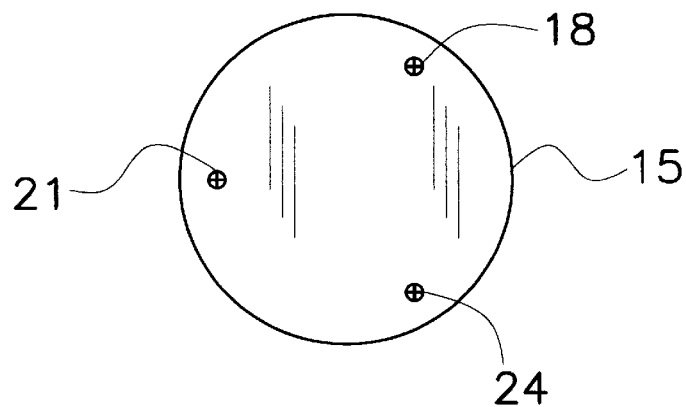
FIG. 5 illustrates an end view of the tilting plate utilized by the present alignment device.

A device, referred to herein as a receive/position/lock device, ("RPLD"), for providing automated alignment of a workpiece centerline with a machine tool centerline, constructed in accordance with the present invention, is illustrated generally as 10 in the figures. It is known that proper machining of a workpiece, such as work piece 120, requires aligning the centerline 125 of workpiece 120 with the centerline 135 of the machine tool 130. Centerline 125 can be defined either as being perpendicular to a specified face and passing through the center of a specified datum diameter, or it can be defined as passing through the centers of two specified datum diameters, which are most likely at opposite ends of a given workpiece. RPLD 10 is designed for rigid attachment to various standard spindle designs, such as spindle 12. RPLD 10 incorporates a tilting plate 15 which allows for tilting around three separate axis. In this regard tilting plate 15 incorporates three threaded axis 18, 21, and 24, which are driven by servos 19, 22, and 25 respectively. Further, RPLD 10 incorporates cross-slide 30 comprising a horizontal slide member 34 and an orthogonally displaced vertical slide member 37 which are driven by servos 35 and 38, respectively. Cross-slide 30 provides transverse or translational movement in a plane perpendicular to the machine tools centerline. Further, the RPLD can be adapted so as to provide service, such as a vacuum line, through the RPLD to the workpiece.

RPLD 10 further includes a fixture 50, adapted to engage RPLD 10, for fixedly receiving workpiece 120. Fixture 50 is removably secured to RPLD 10 and is engaged by RPLD 10 by jaws 55. In use, RPLD 10 would be installed on spindle 12 of machine tool 130. When delivered to machine tool 130, workpiece 120 would be locked in fixture 50. Jaws 55 of RPLD 10 would be actuated by fixture 50 and would lock fixture 50 into a rigid connection with the RPLD 10.

RPLD 10 is controlled by processing unit 60. In this regard, as will be discussed more fully herein below, processing unit 60 receives data from a plurality of conventional transducers and, based on this data, activates servos 19, 22, 25, 35 and 38 accordingly. Processing unit 60 can be any of a variety of logic circuits, including without limitation, microprocessor logic, discrete logic and integrated circuit logic.

Figure 6:
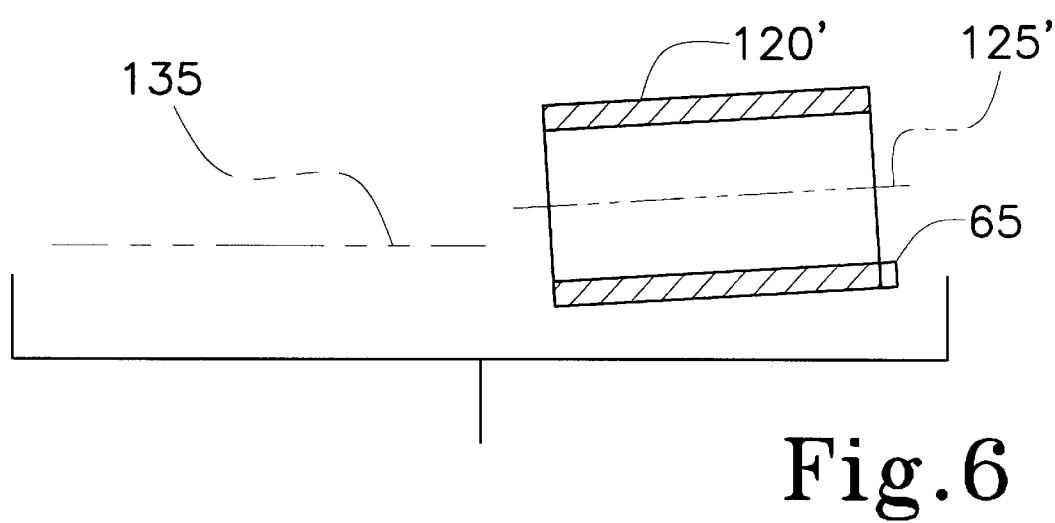
FIG. 6 illustrates a schematic view of one embodiment of transducer placement.
Figure 7:
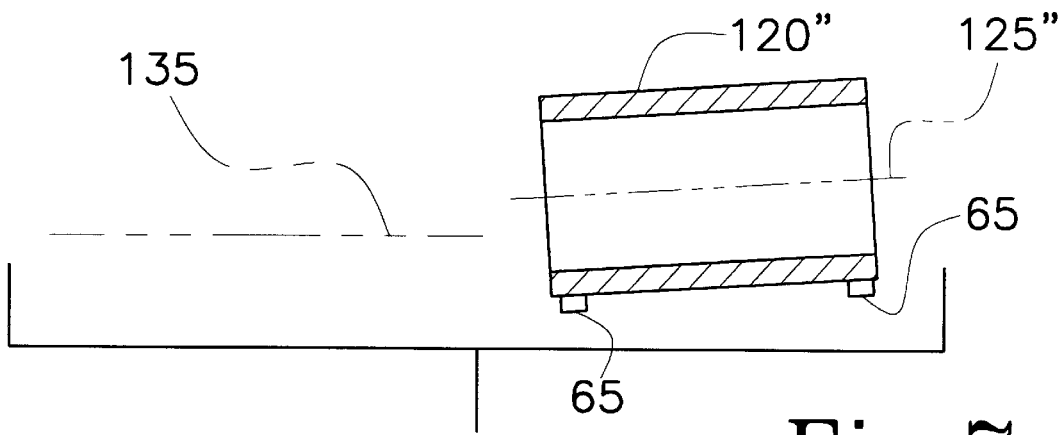
FIG. 7 illustrates a schematic view of an alternate embodiment of transducer placement.

Alignment of centerline 125 of workpiece 120 with the centerline 135 of the machine tool 130 with RPLD 10 is a two step operation. First, the centerline of the workpiece must be positioned so as to be parallel to the centerline of the machine tool. Second, the centerline of the workpiece must be adjusted so as to be coincident with the centerline of the machine tool. In this regard, where the centerline of the workpiece is defined as being perpendicular to a specified face and passing through the center of a specified datum diameter, transducer 65 is positioned so as to indicate the face plane to which centerline 125 should be perpendicular. See FIG. 6. With transducer 65 so positioned, machine spindle 12, with RPLD 10 and workpiece 120 in place, is rotated 360°. This will typically result in a high reading and a low reading. Referring to the Figures those skilled in the art will recognize that the Figures are not intended to be drawn to scale, but rather illustrate the components of RPLD 10 in schematic fashion. FIG. 1 illustrates a relationship between workpiece 120, machine tool 130 and RPLD 10 which is typical upon placement of fixture 50 upon RPLD 10. Namely, centerline 125 is neither parallel nor coincident with centerline 135. Based on the initial high and low readings from transducer 65, processing unit 60 activates tilting plate 15 such that rotation of the workpiece 120 would produce no runout, thus indicating that centerline 125 was substantially parallel with center line 135, as illustrated in FIG. 2. As can be seen in FIG. 2, while centerline 125 is now parallel to centerline 135 it is not coincident with centerline 135. In order to complete the alignment of centerlines 125 and 135, transducer 65 is positioned so as to indicate on the datum diameter. Again, workpiece 120 is rotated through 360°, resulting in a high reading and a low reading. Based on these high and low readings from the repositioned transducer 65, processing unit 60 activates cross-slide 30 to move such that the two readings from transducer 65 would now be substantially equal. As seen in FIG. 3, vertical slide member 37 of cross-slide 30 has been moved in the direction of arrow 65 such that centerline 125 and centerline 135 are now coincident.

Where the centerline of the workpiece is defined as passing through the centers of two specified datum diameters, a pair of transducers 65 is positioned so as to indicate the two datum diameters. See FIG. 7. With transducers 65 so positioned, workpiece 120 is rotated through 360°. As discussed above, this will typically result in a high reading and a low reading from each of the two transducers. Based on the initial high and low readings from transducer 65, processing unit 60 activates tilting plate 15 such that rotation of the workpiece 120 would produce identical runout from the two transducers, thus indicating that centerline 125 was substantially parallel with center line 135. Workpiece 120 is rotated again through 360° and based on the data from transducers 65 processing unit 60 activates cross-slide 30 to move such that centerline 125 and centerline 135 are both parallel and coincident. With each example, those skilled in the art will recognize that transducer 68, which indicates the rotational position of spindle 12, is utilized to provide baseline data with which processing unit 60 establishes centerline 135.

From the foregoing description, it will be recognized by those skilled in the art that an alignment device offering advantages over the prior art has been provided. Specifically, the alignment device provides a device for mechanizing the alignment of the centerline of an object-of-revolution workpiece with the centerline of a machine tool upon which the workpiece is mounted. The alignment device of the present invention further provides such a device that is adapted for rigid attachment to various standard spindle designs.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A device for automatically aligning a centerline of a workpiece with a centerline of a rotating machine tool, said device comprising;

an attachment member adapted for rigid attachment to a machine tool spindle carried by a first end of said device;

a fixture for fixedly receiving a workpiece, wherein said fixture is adapted for releasable engagement by a second end of said device;

a tilting plate member for tilting said fixture positioned between said first and said second ends of said device;

a cross-slide member for providing translational movement to said fixture positioned between said first and said second ends of said device;

at least one transducer positioned on the workpiece for detecting a relative position and angle of a centerline of the workpiece in relation to a centerline of the machine tool; and a processing unit in electronic communication with said transducer, said tilting plate member and said cross-slide member, wherein said processing unit receives data from said transducer and controls movement of said tilting plate member and said cross-slide member based upon said data, whereby the centerline of the workpiece is positioned so as to be coincident with the centerline of the machine tool.

2. The device of claim 1 wherein the centerline of the work piece is perpendicular to a selected face of the workpiece and passes through a selected diameter of the workpiece.

3. The device of claim 1 wherein the centerline of the workpiece passes through centers of two specified datum diameters at opposite ends of the workpiece.

4. The device of claim 1 wherein said tilting plate includes three servo-driven threaded axis that are parallel to the centerline of the machine tool.

5. The device of claim 1 wherein said cross-slide member includes a horizontal slide member and an orthogonally displaced vertical slide member, wherein said horizontal slide member and said orthogonally displaced vertical slide member are servo-driven.

6. The device of claim 1 wherein said device is adapted so as to provide fluid communication between the machine tool and the workpiece.

7. The device of claim 1 wherein said fixture is engaged by jaws, wherein said jaws are actuated by said fixture and fixedly engage said fixture.

8. The device of claim 1 wherein said processing unit utilizes a logic circuit chosen from a group consisting of microprocessor logic, discrete logic and integrated circuit logic.

9. A device for automatically aligning a centerline of a workpiece with a centerline of a rotating machine tool, said device comprising;

an attachment member adapted for rigid attachment to a machine tool spindle carried by a first end of said device;

jaws carried by a second end of said device;

a fixture for fixedly receiving a workpiece, wherein said fixture is adapted for releasable engagement by said jaws, wherein said jaws are actuated by said fixture;

tilting means for tilting said fixture positioned between said first and said second ends of said device;

means for providing translational movement to said fixture positioned between said first and said second ends of said device;

detecting means for detecting a relative position and angle of a centerline of the workpiece in relation to a centerline of the machine tool; and a processing unit in electronic communication with said detecting means, said tilting means and said means for providing translational movement, wherein said processing unit receives data from said detecting means and controls movement of said tilting means and said means for providing translational movement based upon said data, whereby the centerline of the workpiece is positioned so as to be coincident with the centerline of the machine tool.

10. The device of claim 9 wherein the centerline of the work piece is perpendicular to a selected face of the workpiece and passes through a selected diameter of the workpiece.

11. The device of claim 9 wherein the centerline of the workpiece passes through centers of two specified datum diameters at opposite ends of the workpiece.

12. The device of claim 9 wherein said tilting means includes three servo-driven threaded axis that are parallel to the centerline of the machine tool.

13. The device of claim 9 wherein said means for providing translational movement includes a servo-driven horizontal slide member and an orthogonally displaced servo-driven vertical slide member.

14. The device of claim 9 wherein said device is adapted so as to provide fluid communication between the machine tool and the workpiece.

15. The device of claim 9 wherein said processing unit utilizes a logic circuit chosen from a group consisting of microprocessor logic, discrete logic and integrated circuit logic.

16. A device for automatically aligning a centerline of a workpiece with a centerline of a rotating machine tool, said device comprising;

an attachment member adapted for rigid attachment to a machine tool spindle carried by a first end of said device;

jaws carried by a second end of said device;

a fixture for fixedly receiving a workpiece, wherein said fixture is adapted for releasable engagement by said jaws, wherein said jaws are actuated by said fixture;

a tilting plate member for tilting said fixture positioned between said first and said second ends of said device, said tilting plate member including three servo-driven threaded axis that are parallel to the centerline of the machine tool;

a cross-slide member for providing translational movement to said fixture positioned between said first and said second ends of said device, said cross-slide member including a servo-driven horizontal slide member and an orthogonally displaced servo-driven vertical slide member;

at least one transducer positioned on the workpiece for detecting a relative position and angle of a centerline of the workpiece in relation to a centerline of the machine tool; and a processing unit in electronic communication with said transducer, said tilting plate member and said cross-slide member, wherein said processing unit receives data from said transducer and controls movement of said tilting plate member and said cross-slide member based upon said data, whereby the centerline of the workpiece is positioned so as to be coincident with the centerline of the machine tool.

17. The device of claim 16 wherein the centerline of the work piece is perpendicular to a selected face of the workpiece and passes through a selected diameter of the workpiece.

18. The device of claim 16 wherein the centerline of the workpiece passes through centers of two specified datum diameters at opposite ends of the workpiece.

19. The device of claim 16 wherein said device is adapted so as to provide fluid communication between the machine tool and the workpiece.

20. The device of claim 16 wherein said processing unit utilizes a logic circuit chosen from a group consisting of microprocessor logic, discrete logic and integrated circuit logic.

* * * * *